UNITED STATES PATENT OFFICE.

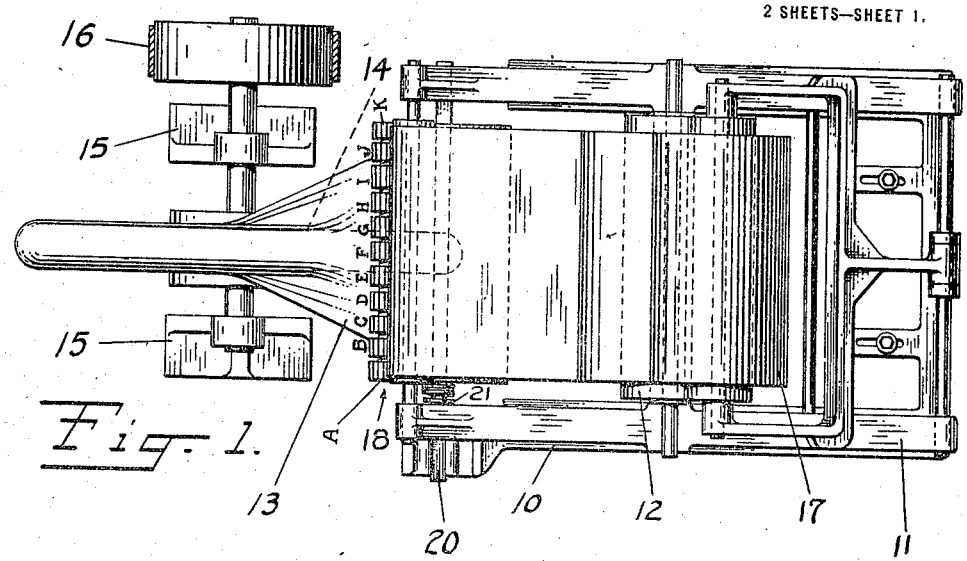
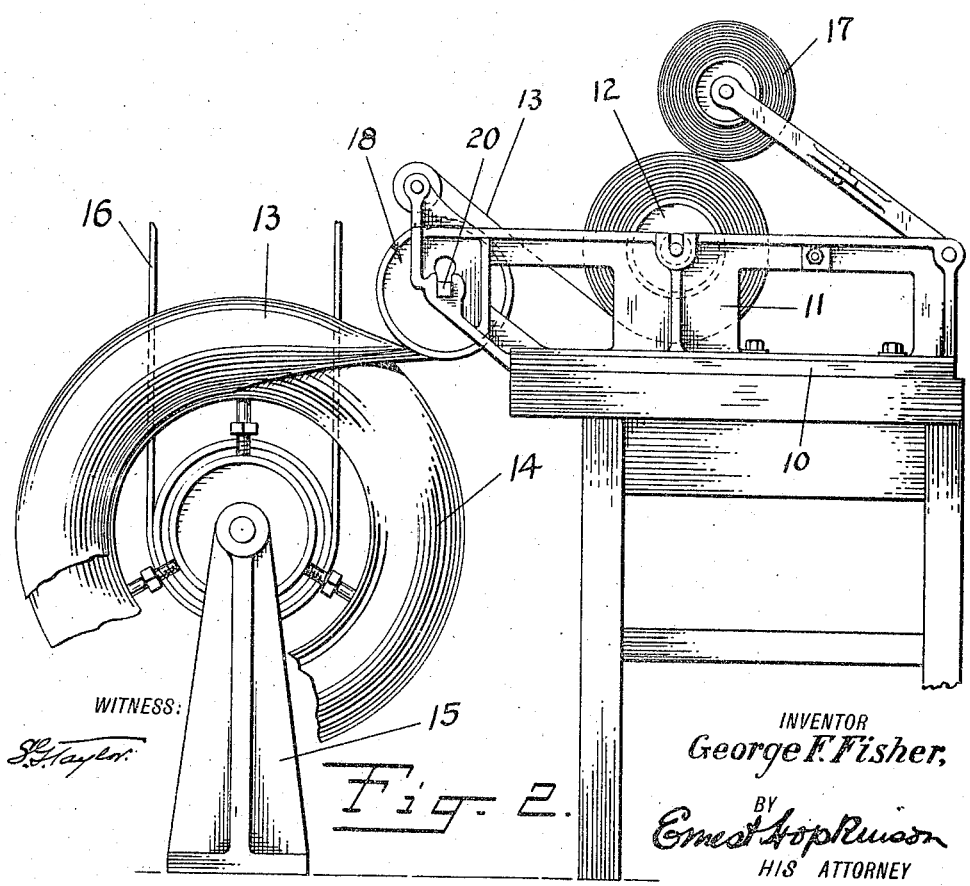

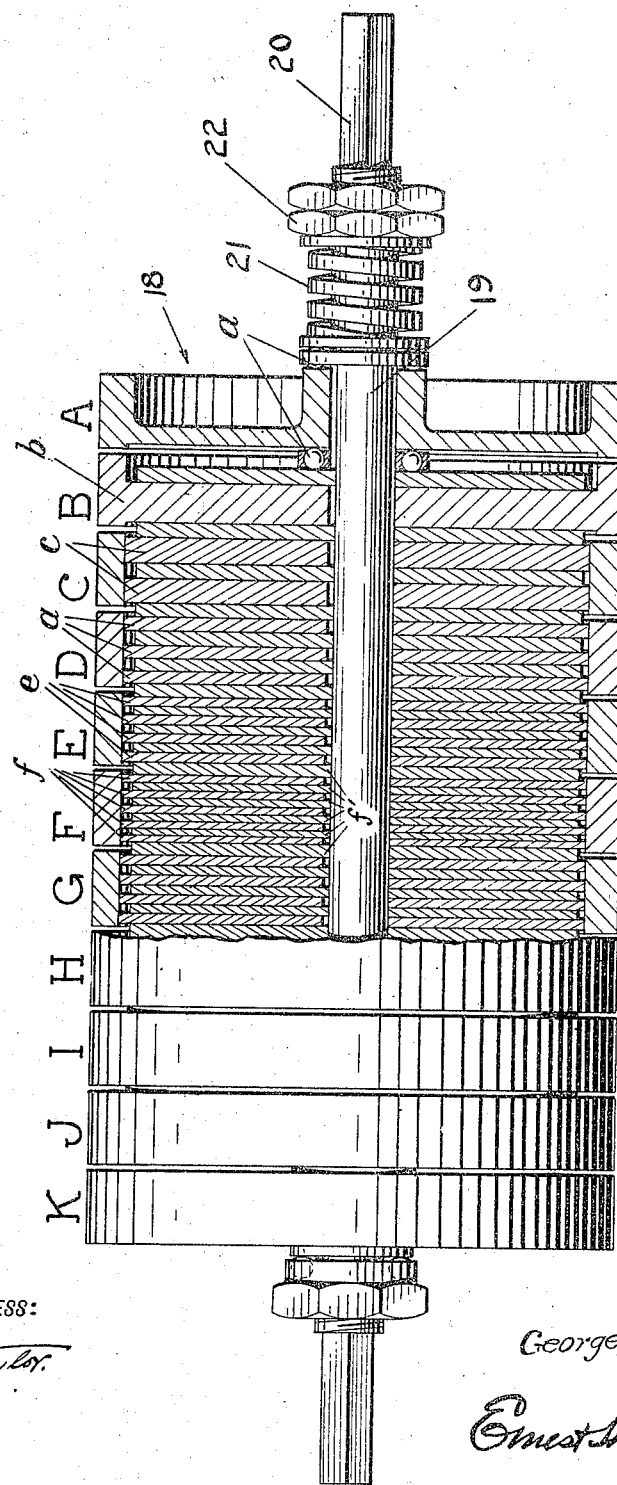

GEORGE F. FISHER, OF PLAINFIELD, NEW JERSEY, ASSIGNOR TO THE HARTFORD RUBBER WORKS CO., A CORPORATION OF CONNECTICUT.

TIRE-BUILDING MACHINE.

1,195,800. Specification of Letters Patent. Patented Aug. 22, 1916.

Application filed June 29, 1915. Serial No. 36,933.

*To all whom it may concern:*

Be it known that I, GEORGE F. FISHER, a citizen of the United States, and a resident of Plainfield, county of Union, State of New Jersey, have invented certain new and useful Improvements in Tire-Building Machines, of which the following is a full, clear, and exact description.

This invention relates to tire building machines, and has for an object to provide a machine adapted to positively and accurately impart a predetermined stretch only to such points in the fabric where a stretch is necessary to make the fabric inherently partake of the configuration of a tire forming core.

In the manufacture of tires, to obtain the best results, it is essential that the flat rubber treated bias strips of fabric, from which the carcass is made, be shaped intimately to the rounded surface of the ring core upon which the tire is built. To accomplish this, the angle of the fabric threads must be changed from normal, that is, the squares made by intersecting threads at the middle portion of the fabric must be elongated circumferentially of the core, while the squares at the edges of the fabric must be elongated radially of the core, the intervening squares being graduated between these two extremes. Hitherto attempts have been made to obtain this result by stretching the fabric longitudinally throughout on the way to the core to make the middle portion of the fabric conform readily to the configuration of the outermost portion or crown of the core, and then smoothing out the puckers and crowding the excess material of the margins of the fabric to partake of the configuration of the sides of the core. Usually, to stretch the fabric as it passes on to the core, a unitary tension or stretching drum is employed, the same being mechanically retarded by means of brakes or positive mechanism, so that all points in a line on the surface parallel to the axis of the drum travel at the same speed, which speed is less than the surface speed of the core. As a result, as above stated, the fabric is stretched longitudinally throughout, with the middle portion stretched more than the edges by the arched configuration of the crown of the core. The stretched fabric readily conforms evenly and smoothly to the crown of the core, but due to the edges of the fabric being stretched there will exist an excessive puckering at the margins which necessitates excessive stitching to compact, crowd, or foreshorten, the surplus material to conform to the sides of the core. As a result of this stretching of the edges of the fabric on the way to the core, detrimental variations occur in the finished tires. For example, if a number of finished tires are compared with respect to the angular relation of the threads, especially near the beads, considerable variation will be found to exist in the tires, one from the other. These variations I attribute to the excessive "stitching" or smoothing out of puckers now required. It is obvious, that wherever there exists a surplus of fabric there must be some stitching performed to shape the same to the core, and as this surplus is decreased, so also will the stitching operation have decreased distorting effect. Hence it follows that when this surplus fabric can be reduced to a minimum or even eliminated, the stitching operation will be correspondin v reduced, with a corresponding decrease in vai tion, or even elimination of all variation between individual tires.

My present invention contemplates elimination of longitudinal stretch in the margins of the fabric, thereby reducing puckering to a minimum, and consequently reducing the stitching operation to a mere superficial rubbing, so that the above noted variations in the product will be nearly, if not in fact entirely, eliminated.

To eliminate excessive puckering of the fabric I cause the fabric to be stretched only at points where a stretch is necessary to make it inherently partake of the configuration of the core. When this is done, not only will the middle portion of the fabric conform smoothly and evenly to the crown of the core, but also will the margins conform readily without the usual excessive stitching to the sides of the core.

In carrying out the invention I provide a stretching device formed of a plurality of annuli which move relatively to each other at different speeds. The surface speed of the several annuli is so regulated relatively to the surface speed of the core that there is imparted to the fabric passing from certain of the annuli a stretch corresponding to the stretch required in the fabric at corresponding points on the core, while where no stretch is desired, the fabric will pass idly without any stretch whatever from the corresponding annuli to the core.

One result obtained by the use of my improved stretching device is that the tires are more uniform, that is, there exists a less angular variation between the threads at corresponding points in a number of tires than tires produced by the old methods. Another result is that my improved stretching device lays more fabric in an undisturbed condition in the tire than has hitherto been possible, with a resultant strengthening of this most important strain-resisting portion of the tire. Still another result is the elimination in great part, if not all of the stitching operation hitherto essential with consequent reduction in time and manual labor and resultant increased output.

The invention can be readily understood from the following description taken in connection with the accompanying drawing, in which—

Figure 1 is a plan view of a tire building machine embodying my improvements; Fig. 2 is a side elevation of the parts shown in Fig. 1; Fig. 3 is a longitudinal sectional view through the stretching drum with portions in elevation.

Referring now to the drawings in which like characters of reference designate similar parts, 10 designates a base upon which is mounted a frame 11 that carries a stock roll 12, from which rounds or plies of rubber treated bias fabric 13 are supplied to a ring core 14. The core is revolubly mounted upon a standard 15 and is adapted as usual to be power driven as indicated at 16, or otherwise. During each single revolution of the core at about a speed of 10 revolutions per minute, more or less, a round of fabric is drawn from the stock roll on to the core in the usual and well known manner, the liner strip which separates the convolutions of the stock roll being simultaneously spooled upon a roll 17, as shown. On the way to the core, in the present embodiment, the fabric passes over and frictionally drives my improved stretching device 18, which will now be described.

In constructing the stretching device I provide a plurality of annuli designated by the letters A to K inclusive, the same being assembled upon a shaft 19 which is held against turning in the frame 11 by means of its squared ends 20 fitting in correspondingly shaped sockets in the frame, or otherwise. These annuli each rotate on the shaft at a predetermined surface speed relative to the speed of a corresponding portion of the surface of the ring core. In the present embodiment the surface of the central annulus F is about 14% less than the surface speed of the crown of the core, the surface speed of the terminal annuli A—K is identical with the surface speed of the bead portions of the core, and the intervening annuli are graduated as to surface speed between these two extremes, that is, each rotates at a slightly greater surface speed than its neighbor as the annuli progress from the annulus F to the annuli A—K. Thus a pronounced drag on the middle portion of the fabric is produced, the edges of the fabric travel free and unobstructed, and even with slight compacting due to foreshortening in width as the fabric is elongated centrally, and the intervening portions are retarded to a degree corresponding to the position in the series of the respective annuli from which they pass. Thus the fabric is shaped uniformly and smoothly to substantially all points in the surface of the core.

In the present embodiment, I have illustrated friction disks as the means for controlling the rotation of the various annuli. The speed of each annulus is governed by the amount of frictional resistance it must overcome, and this frictional resistance, in the present instance, is governed by the number of disks carried by each annulus, each friction disk having two operative surfaces contacting with corresponding surfaces of friction disks carried by the axle. For example, the annulus F has ten friction surfaces formed by the five disks $f$ engaging the disks $f'$, the annulus E has eight friction surfaces formed by the four disks $e$, the annulus D has six friction surfaces formed by the three disks $d$, the annulus C has four friction surfaces formed by the two disks $c$, the annulus B has two friction surfaces formed by the single disk $b$, and the annulus A has no friction surfaces at all but idles freely between the ball bearings $a$. The symmetrically positioned annuli and disks on the opposite side of the annulus F are counterparts of the ones just described. In order that the frictional resistance may be increased or diminished to suit varying conditions in the fiber and rubber of the bias fabric, a tension spring 21 is seated on the shaft 19 and is confined against the terminal annulus A by a set nut 22 by means of which the spring may be controlled to move the disks to increase or diminish frictional engagement therebetween. The respective disks are splined as shown on the shaft 19 and on the annuli to permit movement of the various parts under urging of the spring.

While I have illustrated a specific embodiment of my invention I do not limit myself to the mechanism shown, as various modifications may be resorted to. For instance, the annuli may be rotated mechanically and positively, as by gearing or otherwise instead of being frictionally driven and controlled by friction devices. I do not intend to limit myself to the number of the disks illustrated, as I may employ any suitable number that will attain the conditions and results accruing from a practice of the principle of my invention. Nor do I limit myself to the particular surface speeds of the various annuli as above described, as I may increase or diminish the surface speeds, either uniformly or variably, of all or any of the annuli from that above described.

I believe that I am the first to conceive of a stretching drum formed of a plurality of independent revoluble annuli, the surface speeds of which are controllable relatively to the surface speeds of corresponding portions on a tire forming core, and I therefore consider that any and all apparatus which embodies relatively revoluble sections in a stretching device for tire building machines falls within the scope of my invention.

Having described my invention, what I claim and desire to protect by Letters Patent is:

1. A tire building machine embodying a revoluble core, a stock supply, and a stretcher drum embodying a plurality of revoluble sections, the surface speeds of which are controllable relatively to the surface speeds of corresponding portions of the core.

2. A tire building machine embodying a revoluble core, a stock supply, revoluble annuli frictionally engaging the stock on the way to the core, and means controlling the annuli to rotate at respective predetermined ratios of surface speed relatively to corresponding portions on the surface of the core.

3. A tire building machine embodying a revoluble core, a stock supply, a plurality of revoluble annuli coacting in frictionally engaging the stock throughout its entire width on the way to the core, and means for effecting predetermined control of the relative rotation of the annuli.

4. A tire building machine embodying a revoluble core, a stock supply, independent revoluble annuli frictionally driven by the stock on the way to the core, and means for retarding the rotation of certain of the annuli.

5. A tire building machine embodying a revoluble core, a stock supply, a shaft, a plurality of independent revoluble annuli thereon frictionally driven by the stock on the way to the core, and interengaging disks carried by the shaft and certain of the annuli for frictionally retarding the rotation of said annuli.

6. A tire building machine embodying a revoluble core, a stock supply, and a stretching device frictionally driven by the stock, comprising idler annuli, and an annulus between and rotatable at a slower surface speed than the idler annuli.

7. A tire building machine embodying a revoluble core, a stock supply, a stretching annulus frictionally engaging the middle portion of the stock and rotatable at a less surface speed than the surface speed at the crown of the core, and means on each side of said annulus for idly supporting the margins of the stock.

8. A tire building machine, embodying a revoluble core, a stock supply, and a stretcher drum for the stock comprising a central annulus frictionally engaging the stock and rotatable at a less surface speed than the surface speed of the crown of the core, and an annulus frictionally engaging the stock on each side of and rotatable at a greater surface speed than the central annulus.

9. A tire building machine, embodying a revoluble core, a stock supply, and a stretcher drum for the stock comprising a series of annuli frictionally engaging the stock and each having a different surface speed than its neighbor progressively in the series.

10. A tire building machine, embodying a revoluble core, a stock supply, and a stretcher drum for the stock, comprising a plurality of annuli frictionally engaging the stock and rotatable each at a faster surface speed than its neighbor as the series progress from the center to the margins of the stock.

Signed at New York, N. Y., this 24th day of June, 1915.

GEORGE F. FISHER.